United States Patent [19]

Kuroyanagi

[11] Patent Number: 5,644,288
[45] Date of Patent: Jul. 1, 1997

[54] VEHICLE SPEED DETECTING APPARATUS

[75] Inventor: Susumu Kuroyanagi, Anjou, Japan

[73] Assignee: Nippondenso Co., Ltd., Kariya, Japan

[21] Appl. No.: 491,733

[22] Filed: Jun. 19, 1995

[30] Foreign Application Priority Data

Jun. 20, 1994 [JP] Japan ..................... 6-136930

[51] Int. Cl.$^6$ .................................... B60Q 1/00
[52] U.S. Cl. ................. 340/441; 340/444; 340/466; 364/431.07; 364/565; 364/423.098; 324/166
[58] Field of Search ........................ 340/438, 441, 340/439, 466, 434, 444; 364/424.01, 424.03, 424.04, 426.02, 426.03, 426.04, 431.07, 565; 377/28; 324/161, 172, 166

[56] References Cited

U.S. PATENT DOCUMENTS

| 4,922,197 | 5/1990 | Juds et al. ............. 324/207.21 |
| 5,424,714 | 6/1995 | Kin et al. ............. 340/441 |

FOREIGN PATENT DOCUMENTS

| 54-109361 | 8/1979 | Japan. |
| 59-193361 | 11/1984 | Japan. |
| 60-20703 | 5/1985 | Japan. |
| 64-68616 | 3/1989 | Japan. |
| 4198756 | 7/1992 | Japan. |

*Primary Examiner*—Jeffery Hofsass
*Assistant Examiner*—Daniel J. Wu
*Attorney, Agent, or Firm*—Cushman, Darby & Cushman IP Group of Pillsbury Madison & Sutro LLP

[57] ABSTRACT

Rotational speed of a vehicle speed detecting gear 1 is detected by a detection element 2 using an MRE or the like and the detected signal is waveform-shaped by a waveform shaping circuit 3 to serve as a vehicle-speed pulse signal. The cycle of the vehicle-speed pulse signal is detected by a sampling circuit 4. The detected cycle of the pulse signal is multiplied by a predetermined multiplier in a multiplication circuit 6 and the multiplication result is divided by a predetermined divisor in a diving and pulsing circuit 8. Then, a pulse signal having the cycle equivalent to the division result is output as a divided vehicle-speed pulse signal.

11 Claims, 7 Drawing Sheets

VEHICLE SPEED DETECTING APPARATUS

CROSS REFERENCE TO RELATED APPLICATION

This application is based upon and claims priority from Japanese Patent Application No. Hei. 6-136930 filed Jun. 20, 1994, the contents of which are incorporated herein by reference.

BACKGROUND OF THE INVENTION

1. Field of the Invention

The present invention relates to a vehicle speed detecting apparatus for detecting a traveling speed of a vehicle, particularly to a vehicle speed detecting apparatus for taking an input vehicle-speed signal whose period changes with the vehicle speed and producing an output a vehicle-speed pulse signal having a desired period by altering the period of the input vehicle-speed signal by any desired ratio.

2. Related Art

An existing vehicle speed detecting apparatus (vehicle speed sensor) for a speedometer obtains a vehicle-speed pulse signal from a first gear for driving the speedometer and a second gear for rotating a magnet in a transmission of a vehicle. The vehicle speed determined by detecting the rotational speed of the magnet. In this case, a vehicle-speed pulse signal having a standardized period is obtained by setting the gear ratio between the first and second gears correspondingly for each type of vehicle or the like and thereby adjusting the rotational speed of the magnet.

However, a gear-approach-type vehicle speed sensor for directly detecting the rotational speed of a gear has recently been developed as disclosed in U.S. Pat. No. 4,922,197 or U.S. application Ser. No. 08/162,625. For example, there is a gear-approach-type vehicle speed sensor which employs an MRE (Magnetic Resistance Element) to directly detect the rotational speed of the gear. In the case of the gear-approach-type vehicle speed sensor, however, it is impossible to adjust a gear ratio each type of vehicle or the like because neither the first gear for driving the speedometer nor the second gear for rotating the magnet are employed.

Therefore, it is necessary to change the number of teeth of the gear to detect the rotational speed even for the same transmission correspondingly to each type of vehicle or the like. However, when a frequency dividing ratio expressed by a fraction is necessary, it is impossible to obtain the desired frequency dividing ratio by changing the number of teeth of the gear because the number of teeth of a gear is a natural number. Therefore, a gear-approach-type vehicle speed sensor requires a circuit for changing the frequency dividing ratios.

Various dividing circuits by which any frequency dividing ratio can be set have been proposed. For example, a vehicle speed detecting apparatus by which any frequency dividing ratio can be set is disclosed in of Japanese Patent Laid-Open No. Hei. 4-198756.

In this vehicle speed detecting apparatus, however, dividing is performed merely at a frequency dividing ratio of 1/n and therefore, it is impossible to divide at an optional frequency dividing ratio M/D (M and D are natural numbers).

Japanese Patent Laid-Open No. Sho. 64-68616 discloses an apparatus using a vehicle distance recorder in which dividing is performed at a frequency dividing ratio M/D.

In this apparatus, however, the frequency dividing ratio is obtained by changing frequency dividing ratios at a certain period. Therefore, when changing the frequency dividing ratios before one period of an output pulse signal terminates, the period of an output pulse signal fluctuates when the dividing ratios are changed. Thus, the apparatus can be applied to a vehicle distance recorder but it cannot be applied to a meter such as a speedometer which quickly responds to the output pulse signal because a pointer thereof swings.

SUMMARY OF THE INVENTION

The present invention is made to solve the above problems and its object is to provide a vehicle speed detecting apparatus making it possible to alter the period of a vehicle-speed pulse signal with an altering ratio M/D (M and D are natural numbers) without fluctuating the period of the vehicle-speed pulse signal.

A vehicle speed detecting apparatus according to an embodiment of the present invention comprises a pulse signal output device for outputting a vehicle-speed pulse signal having a period proportional to a rotational speed of a gear attached to a shaft rotated in accordance with the traveling of a vehicle and a dividing device for dividing the vehicle-speed pulse signal and outputting the divided pulse signal. The dividing device is composed of a period detecting device for detecting a period of the vehicle-speed pulse signal, a multiplying device for multiplying the detected period by a predetermined multiplier, and a division device for dividing the multiplication result by a predetermined divisor. The dividing device outputs a pulse signal having a period equivalent to the division result as the divided vehicle-speed pulse signal.

Therefore, though an existing apparatus can only perform rough dividing at a dividing ratio 1/n, the prevent invention makes it possible to perform minute dividing corresponding to the setting for each type of vehicle because a predetermined multiplier is further multiplied.

The period of a vehicle-speed pulse signal can be detected as the number of clock pulses of a clock signal generated during the period of the vehicle-speed pulse signal. In this case, an output pulse signal is generated which has a period obtained by multiplying the detected number of clock pulses by a set dividing ratio and the period of the clock signal. The generated pulse signal is output as the divided vehicle-speed pulse signal.

Therefore, it is possible to output the divided vehicle-speed pulse signal having a high resolution because of the period detection using a clock signal and the dividing operation according to the detected period.

Moreover, the above dividing can be performed by generating a pulse signal with a period obtained by multiplying the detected number of clock pulses and a predetermined multiplier data together, dividing it by predetermined divisor data, and multiplying it by the period of the clock signal.

That is, assuming the period of a vehicle-speed pulse signal as T, the period of a clock signal as t, multiplier data as M, and divisor data as D, the period TOUT of a divided vehicle-speed pulse signal to be output is obtained as (T/t)×M/D×t.

Moreover, the division using the divisor data and the multiplication using the period of the clock signal can be performed by performing division using the divisor data at the generation timing of the clock signal. By performing the division responsive to the generation timing of the clock signal, the division and multiplication can easily be performed.

Furthermore, the division using the divisor data and the multiplication using the period of the clock signal can be performed by first performing division using the divisor data and then detecting periods in which the clock signal is generated up to the number obtained from the division.

For example, it is possible to use a counting device to which a number obtained from the division is preset to detect the period in which a clock signal is generated by counting down the preset number in accordance with the clock signal.

Moreover, a detected number of clocks is multiplied by the multiplier data, a value obtained by dividing the multiplication result by a predetermined value is divided by the divisor data and then multiplied by the period of the clock signal to generate a cyclic pulse signal, and the cyclic pulse signal is divided into the predetermined value to output a divided vehicle-speed pulse signal having a predetermined duty ratio.

Therefore, when assuming the predetermined value as 2, the cycle TOUT is obtained from the expression "(T/t)×M× (1/2)×(1/D)×t×2" and thereby a divided vehicle-speed pulse signal having a desired duty ratio can be output by finally diving into the predetermined value. When driving a speedometer by F/V (frequency/voltage)-converting the output divided vehicle-speed pulse signal, it is possible to accurately perform the F/V conversion with the duty ratio signal.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings:

DETAILED DESCRIPTION OF THE PREFERRED EMBODIMENTS

The present invention is described below by referring to the embodiments shown in the accompanying drawings.

Figure 1:
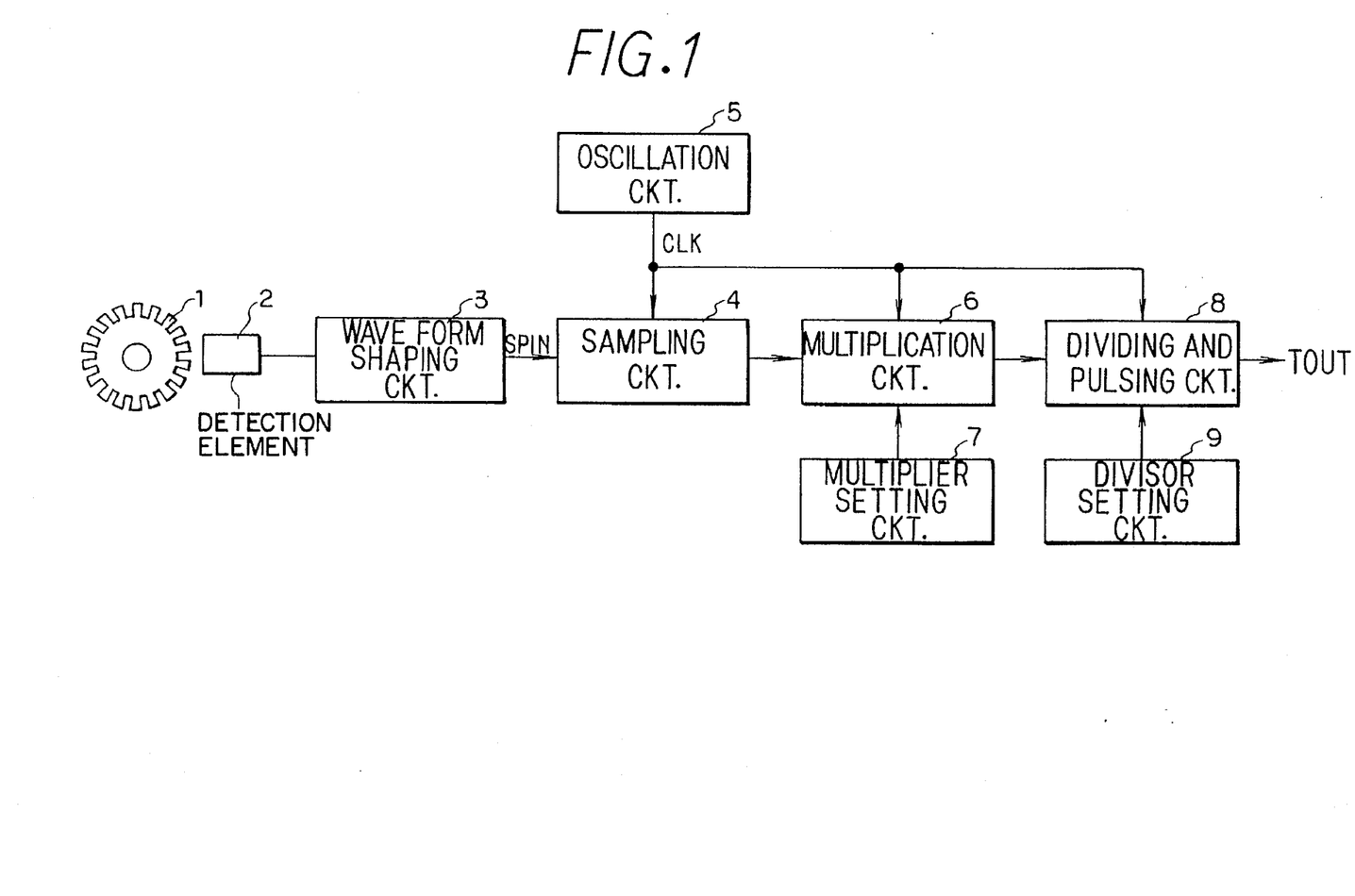
FIG. 1 is a block diagram showing the whole structure of an embodiment of the present invention.

FIG. 1 is a block diagram showing an embodiment of the present invention. In FIG. 1, rotational speed of a vehicle-speed detecting gear 1 in a transmission is converted into an electrical signal by a detection element 2 using an MRE (Magnetic Resistance Element), a coil or the like. The electrical signal is waveform-shaped by a waveform shaping circuit 3 to serve as a vehicle-speed pulse signal (SPIN). The vehicle-speed pulse signal includes one pulse for each of the teeth of the gear 1 and has a period proportional to the rotational speed of the gear 1.

The period T of the vehicle-speed pulse signal is converted into a digital value by a sampling circuit 4 and thereafter increased up to M times by a multiplication circuit 6 and decreased up to 1/D by a dividing and pulsing circuit 8. As a result, a vehicle-speed pulse signal with a period of T×(M/D) is output.

The output vehicle-speed pulse signal is F/V-converted in a not-illustrated speedometer driving circuit in order to drive a speedometer according to the above pulse signal. The above values M and D are set as digital data by a multiplier setting circuit 7 and a divisor setting circuit 9, and a vehicle-speed pulse signal having a desired period can be obtained by setting these pieces of data correspondingly to each type of vehicle.

Definite structures of the above circuits are described below.

First, a vehicle-speed pulse signal waveform-shaped by the waveform shaping circuit 3 is converted into digital data in the sampling circuit 4 by using a reference oscillation signal (CLK; hereinafter referred to as a clock signal) output from an oscillation circuit 5.

Figure 2:
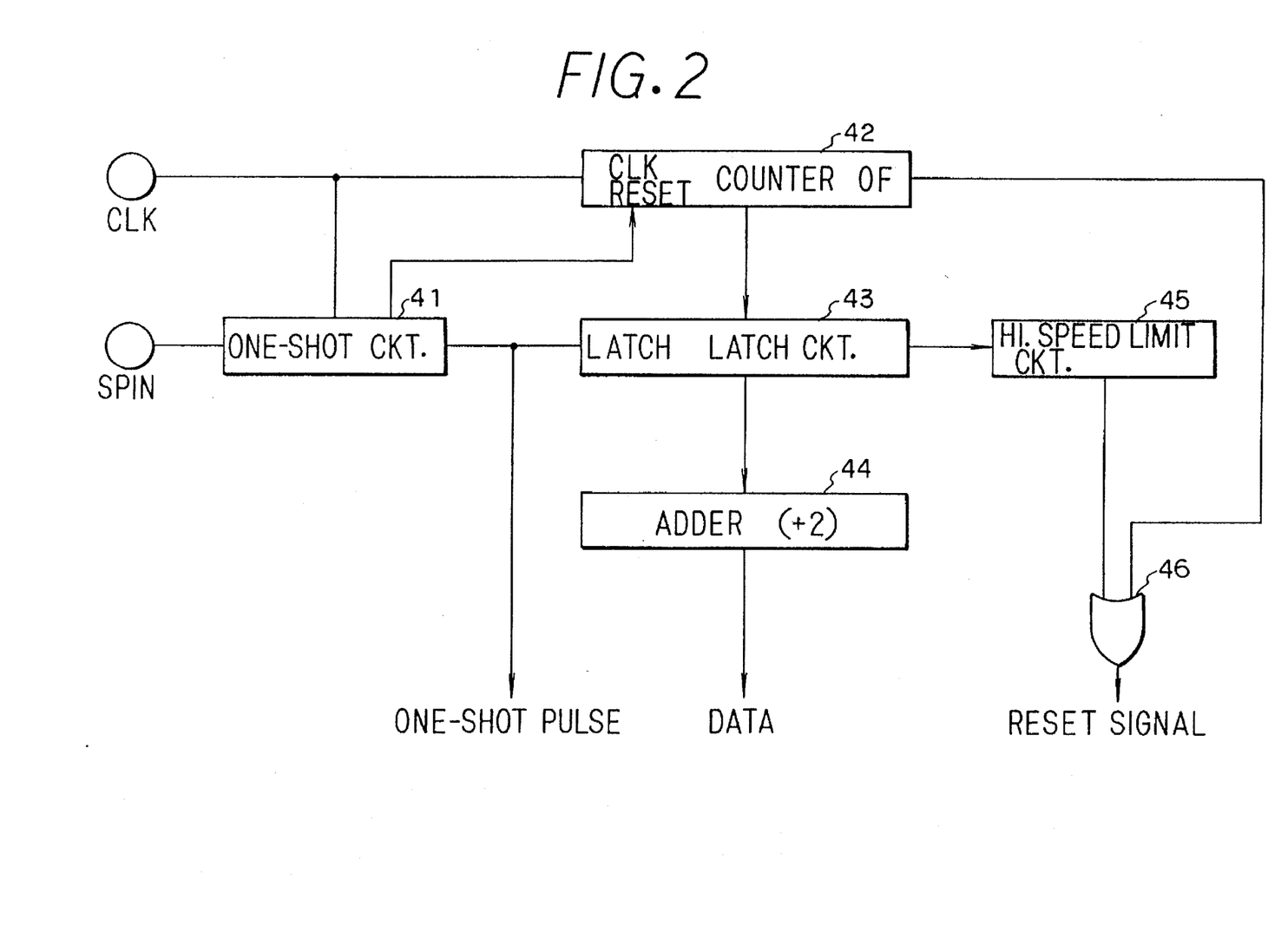
FIG. 2 is a circuit diagram showing the detailed structure of the sampling circuit 4 in FIG. 1.

FIG. 2 shows a detailed structure of the sampling circuit 4. In FIG. 2, a one-shot circuit 41 detects the leading edge of the vehicle-speed pulse signal and outputs a latch signal and a counter reset signal in order. A latch circuit 43 latches a counted value by a counter circuit 42 responsive to the latch signal. The counter circuit 42 is reset by receiving the counter reset signal output after latching the counted value and performs counting in accordance with the trailing edge of a clock signal output from the oscillation circuit 5.

FIGS. 5A through 5G show the timing of a signal waveform of each section of these circuits. As shown by the timing chart in FIGS. 5A through 5G, when a latch signal (shown in FIG. 5C) is generated by the one-shot circuit 41, the counted value by the counter 42 is latched by the latch circuit 43 and thereafter the counter 42 is reset by a reset signal (shown in FIG. 5D) generated at the generation timing of the next clock signal to perform counting for the next measurement period.

By repeating the above operations, it is possible to convert the interval between the leading edges of the vehicle-speed pulse signal into a digital value.

Figure 5A:
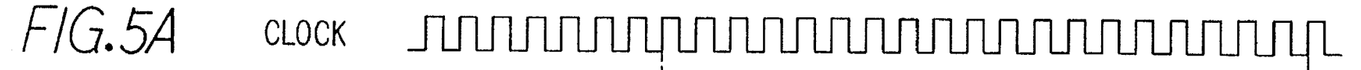
FIGS. 5A through 5G are timing chart showing the timing of a signal waveform of each section.
Figure 5B:
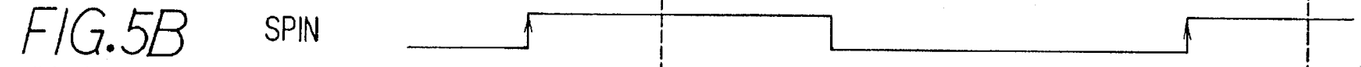
Figure 5C:
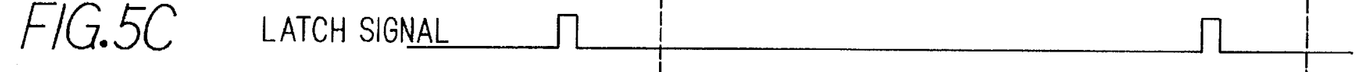
Figure 5D:
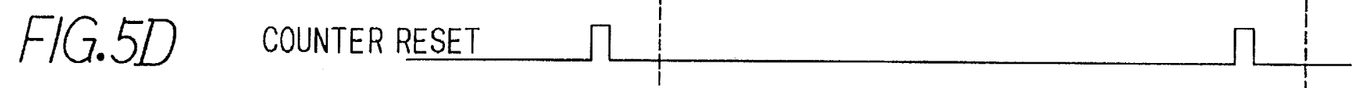

The counted value latched by the latch circuit 43 is smaller than an actual number of clock signals by a value of 2 because of the relation of timing between latch and reset as shown by the timing chart in FIGS. 5c and 5d. Therefore, the value 2 is added to the counted value latched by the latch circuit 43 by a digital adder 44. Conversion of a vehicle-speed pulse signal into digital data is completed by the processing up to here.

In this case, assuming the period of a vehicle-speed pulse signal as T and the oscillation period of a clock signal as t, the obtained digital data DATA is shown by the following expression.

DATA=$T/t$                                                           Expression 1

The minimum input frequency of the sampling circuit 4 is determined by the number of stages of the counter 42 and it can be lowered by increasing the number of stages of the counter 42.

When the period of a vehicle-speed pulse signal is short and data latched by the latch circuit 43 is a predetermined value or less, that is, the vehicle speed corresponding to the latched data is a value equal to or more than a vehicle speed which cannot actually be present, the data is detected by a high-speed limiter 45 as a value which cannot actually be present and a high-speed limit signal is output therefrom.

When the period of the vehicle-speed pulse signal is long and the counter 42 overflows, an overflow signal is output from the counter 42. These high-speed limit and overflow signals are input to an OR circuit 46 and output as reset signals therefrom.

Various signals output from the sampling circuit 4 are input to the multiplication circuit 6 to perform digital multiplication between the data DATA from the sampling circuit 4 and binary multiplication setting data M (7-bit data) from the multiplier setting circuit 7.

The multiplier setting circuit 7 comprises a writable memory such as an EPROM. By using the writable memory, it is possible to set data corresponding to various types of vehicles. This memory can use not only an EPROM but also an EEPROM and a fuse ROM for fusing internal wiring by supplying current to it. Moreover, it is possible to input the multiplication setting data M from an external unit.

Figure 3:
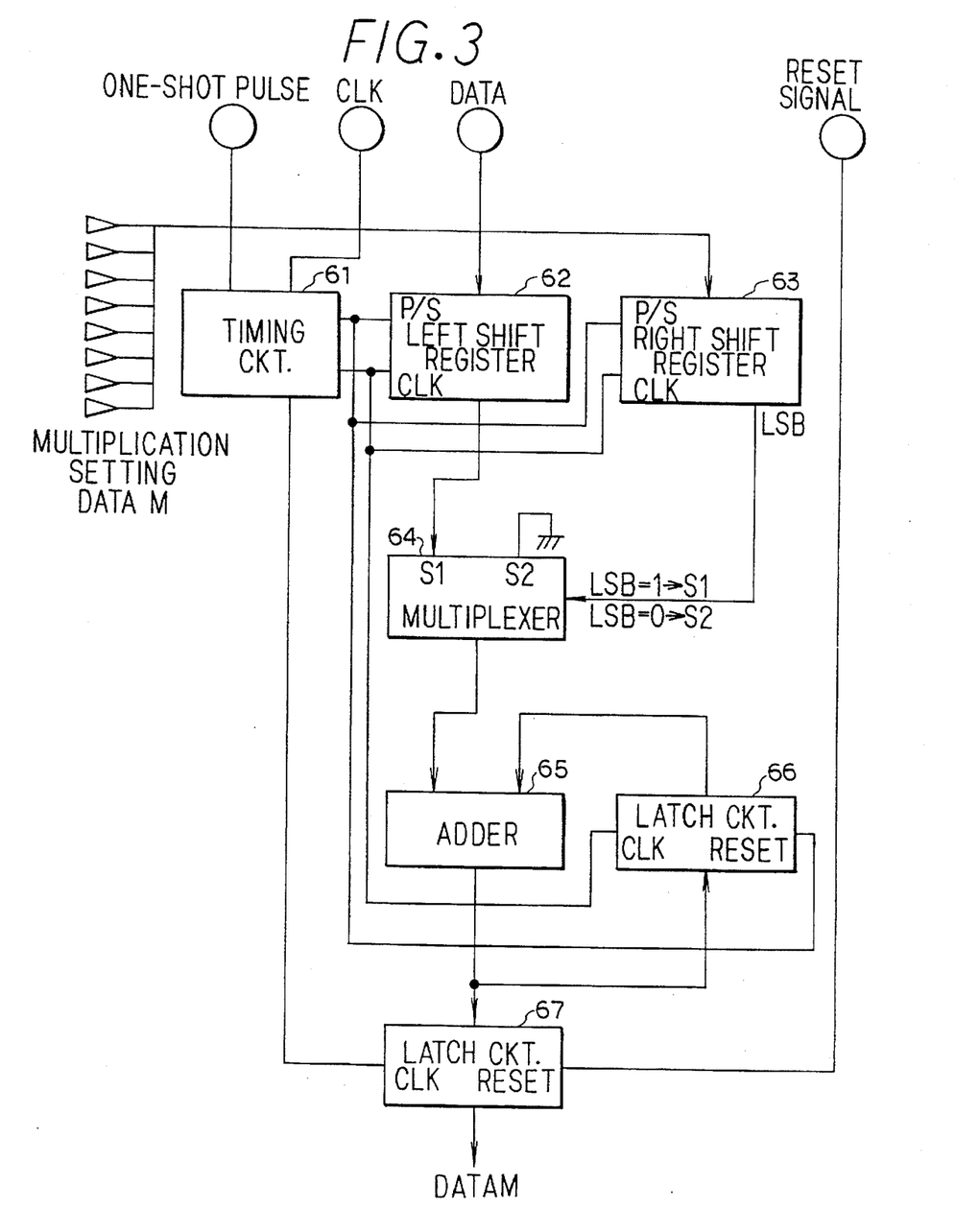
FIG. 3 is a circuit diagram showing the detailed structure of the multiplication circuit 6 in FIG. 1.

FIG. 3 shows a detailed structure of the multiplication circuit 6.

This embodiment performs digital multiplication by employing a method of performing addition in accordance with bit data of the multiplication setting data M while carrying the data DATA.

Figure 5E:
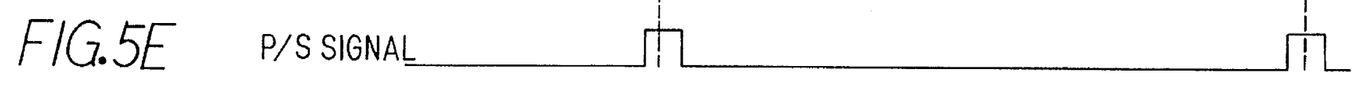
Figure 5F:
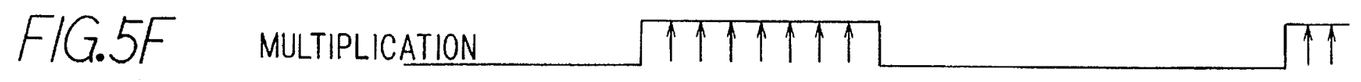

When a latch signal is output from the one-shot circuit 41 of the sampling circuit 4, a timing circuit 61 outputs a high-level parallel/serial (P/S) signal (shown in FIG. 5E) in accordance with a clock signal (shown in FIG. 5A) sent from the oscillation circuit 5 at the timing shown in FIGS. 5A and 5E. Moreover, the timing circuit 61 performs multiplication during the multiplication period shown in FIG. 5F from the point of time when the P/S signal is generated. Specifically, the timing circuit 61 outputs seven clock signals for performing multiplication from the first time to the seventh time correspondingly to the 7-bit multiplication setting data M during the multiplication period.

When the first-time clock signal is output from the timing circuit 61 while the P/S signal is at the high level, a leftward shift register 62 reads the data DATA and a rightward shift register 63 reads the multiplication setting data M from the multiplier setting circuit 7. Thereafter, multiplication is performed using the above read data. The operation of the multiplication is described below.

A multiplexer 64 selects either of input terminals S1 and S2 in accordance with the state of the least significant bit (LSB) of the rightward shift register 63. An adder 65 adds the selected input and the data latched by a latch circuit 66. Because the latch circuit 66 is reset by the P/S signal, an output of the multiplexer 64 is directly output from the adder 65 at the beginning.

Thereafter, when a clock signal for the second-time calculation is output from the timing circuit 61, the leftward shift register 62 shifts the read and stored data leftward by one bit and the rightward shift register 63 shifts the read and stored data rightward by one bit. Then, the multiplexer 64 selects either of the input terminals S1 and S2 in accordance with the least significant bit data of the rightward sift register 63 and the adder 65 adds the selected input and the data latched by the latch circuit 66. In this case, the latch circuit 66 has latched the last addition data in accordance with a clock signal for the first-time calculation sent from the timing circuit 61. Therefore, the adder 65 adds the last data and the present data.

Figure 5G:
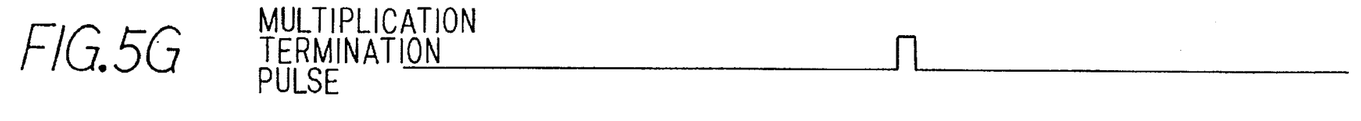

Hereafter, multiplication is performed up to the seventh time synchronously with a clock signal output from the timing circuit 61. When the seventh-time multiplication is completed, the multiplication termination pulse signal shown in FIG. 5G is output from the timing circuit 61 and thereby the then output data of the adder 65 is stored in the latch circuit 67 and output as data DATAM.

Figure 6:
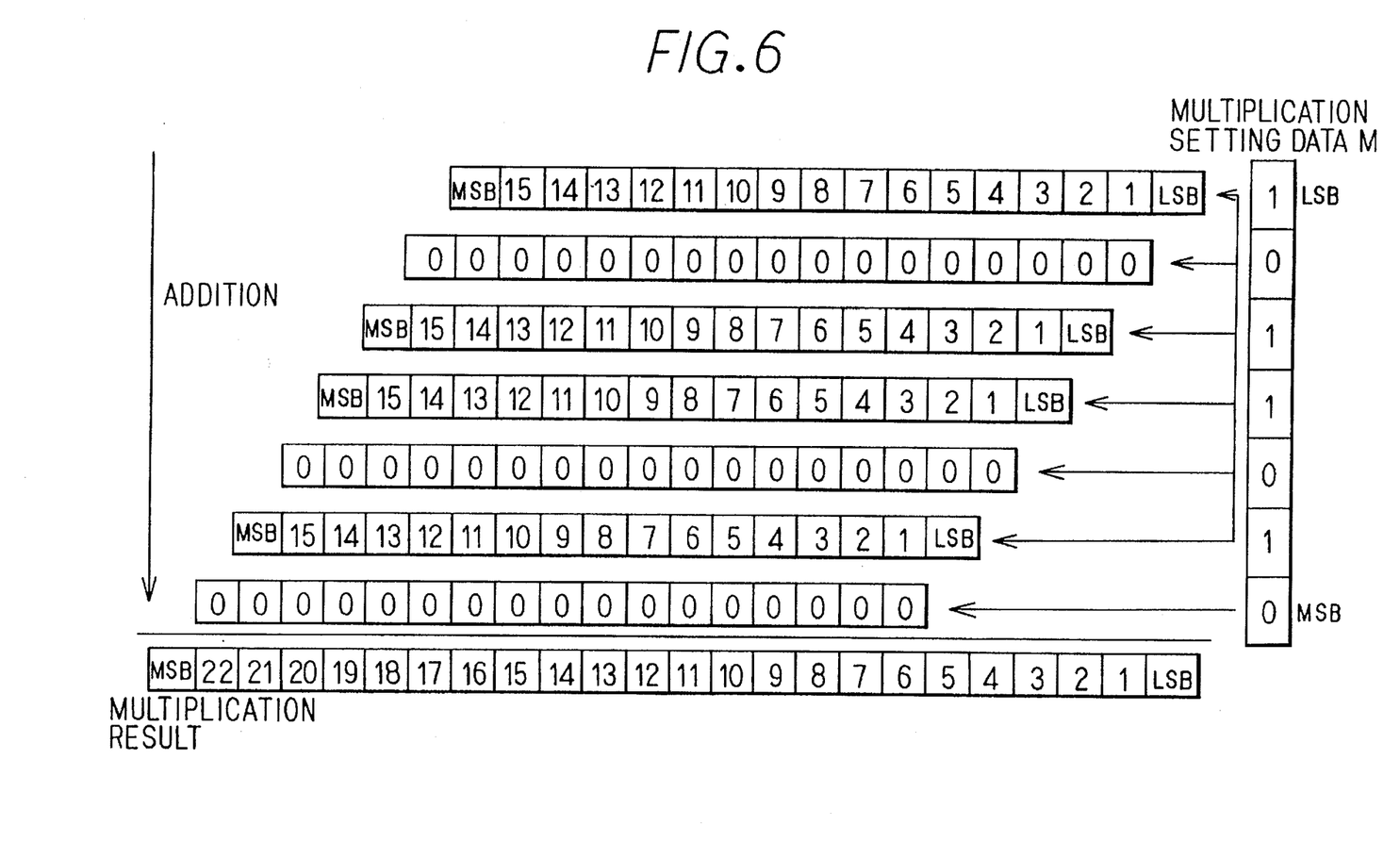
FIG. 6 is an explanation view showing multiplication processing by the multiplication circuit 6.

FIG. 6 shows an example of the multiplication. It is assumed that 7-bit data of "0101101" is set as the multiplication setting data M as shown in FIG. 6. In this case, because the first LSB is set to "1", the multiplexer 62 outputs the data in the leftward register 62 to the adder 65.

When the next clock signal is output from the timing circuit 61, the data in the leftward shift register 62 is shifted leftward by one bit and the data in the rightward shift register 63 is shifted rightward by one bit. As a result, the LSB of the rightward shift register 63 comes to "0". Therefore, the multiplexer 64 outputs data with each bit set to 0 to the adder 65.

Hereafter, similarly to the above, the data in the leftward shift register 62 and that in the rightward shift register 63 are shifted in accordance with a clock signal sent from the timing circuit 61 and the data values sequentially output from the multiplexer 64 shown in FIG. 6 are added by the operations of the adder 65 and the latch circuit 66. Then, a value obtained by adding all data values shown in FIG. 6 is output as a multiplication result.

As the result of the above multiplication, the output data DATAM of the multiplication circuit 6 is shown by the following expression.

$$DATAM = (T/t) \times M \qquad \text{Expression 2}$$

When a reset signal is output from the OR circuit 46 in accordance with a high-speed limit signal or an overflow signal, the above data DATAM becomes low level as a data trouble because the latch circuit 67 is reset.

The data DATAM output from the multiplication circuit 6 is input to the dividing and pulsing circuit 8, divided by the division-setting binary data D set to the divisor setting circuit 9, and moreover pulsed. The divisor setting circuit 9 comprises a writable memory such as an EPROM similarly to the multiplier setting circuit 7.

Figure 4:
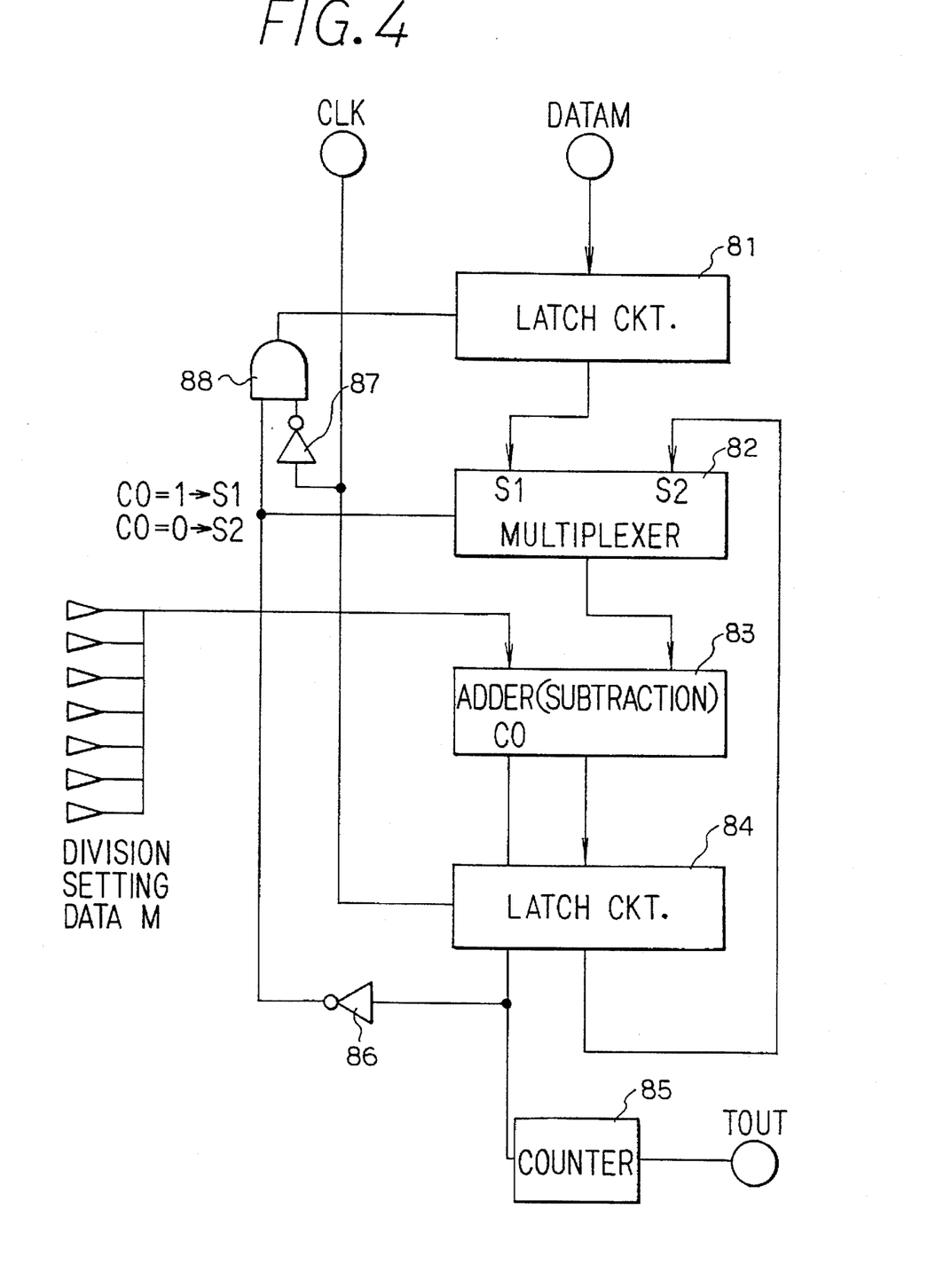
FIG. 4 is a circuit diagram showing the detailed structure of the dividing and pulsing circuit 8 in FIG. 1.

FIG. 4 shows a detailed structure of the dividing and pulsing circuit 8.

First, the input data DATAM is divided by 2 in the latch circuit 81. This operation is performed to form a pulse signal with a duty ratio of 50% using a counter 85 to be mentioned later. Actual division is performed by truncating the LSB of the data DATAM and decreasing the total number of bits by 1.

Subsequent division is performed in accordance with data DATAM/2 latched by the latch circuit 81.

First, the multiplexer 82 selects the outputs of the terminals S1 and S2 in accordance with a carry-out (CO) signal to be described later. Because the CO signal is set to "1" at the beginning, the data DATAM/2 in the latch circuit 81 input to the terminal S1 is output from the multiplexer 82. An adder 83 performs addition of the above data DATAM/2 and the division setting data D (negative value) set by the divisor setting circuit 9, that is, subtraction of the absolute value of the division setting data D from the above data DATAM/2. The subtraction result is latched by the latch circuit 84 at the generation timing of a clock signal output from the oscillation circuit 5.

Thereafter, when the CO signal is set to "0", the multiplexer 82 outputs the data latched by the latch circuit 84, the adder 83 performs substraction of the absolute value of the division setting data D from the subtraction result, and the latch circuit 84 latches the subtraction result in accordance with a clock signal sent from the oscillation circuit 5. Hereafter, the above subtraction is repeated to perform division in accordance with the clock signal sent from the oscillation circuit 5. While the subtraction continues to be performed, the CO terminal of the adder 83 outputs "1" signal. At this time, the CO signal is set to "0" because of the inverter 86.

An answer of the division is a number of repitition of the subtraction. A pulse signal with a period twice as long as a time period corresponding to the answer of the division is output from the counter 85.

When the division is completed, that is, when the subtraction result is smaller than the division setting data D, the output signal from the CO terminal of the adder 83 comes to "0", which is latched by the latch circuit 84. The "0" signal latched by the latch circuit 84 sets an output signal (i.e. The CO signal) of an inverter 86 to "1", and the latch circuit 81 reads the next data DATAM responsive to the CO signal output from an AND circuit 88 in accordance with the AND logic between the "1" signal and a signal obtained by reversing the clock signal sent from the oscillation circuit 5 with an inverter 87.

Moreover, the multiplexer 82 outputs the data in the latch circuit 81 to the adder 83 from the terminal S1 in accordance with the "1" output of the inverter 86 as described above. Therefore, the CO terminal of the adder 83 is set to "1" again. Thus, an output (the CO signal) of the inverter 86 is reversed to "0" by the value "1" of the CO terminal through the latch circuit 84. Thereby, the multiplexer 82 selects the terminal S2 to perform the above subtraction.

That is, when the CO terminal of the adder 83 is set to "0", the next data DATAM is read by the operation of a timing circuit comprising logic circuits 86 to 88 and latched by the latch circuit 84 through the multiplexer 82 and adder 83. Thereafter, when the CO terminal of the adder 83 is set to "1", subtraction is performed with using the above latched data.

Figure 8A:
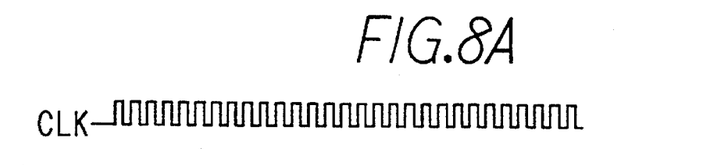
FIGS. 8A through 8C are timing chart showing a generation process of a divided pulse signal with a duty ratio of 50%.
Figure 8B:
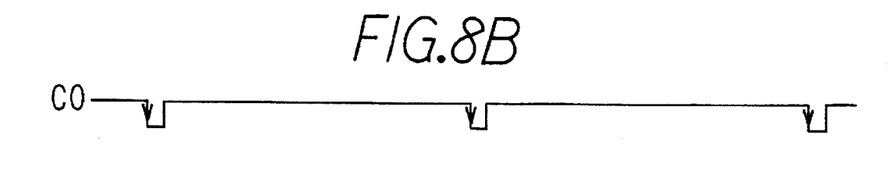

As shown in FIG. 8B, the cycle of a pulse signal when the CO terminal of the adder 83 is set to "0" comes to ½ a period to be found because the data DATAM is divided by 2 by the latch circuit 81.

Figure 8C:
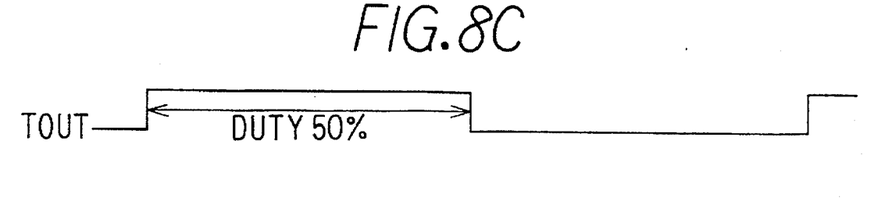

Therefore, a pulse signal having the cycle to be found is obtained by inputting the pulse signal output from the CO terminal to the one-stage counter 85 through the latch circuit 84 and extending the period of the pulse signal up to twice by the counter 85. That is, as shown in FIG. 8C, because an output of the counter 85 is reversed whenever an input pulse (i.e. pulse signal from the CO terminal) falls, the counter 85 generates an output pulse with a duty ratio of 50% by reversing its output whenever the above pulse to be set to "0" is generated. The cycle TOUT of the output pulse is shown by the following expression.

$$TOUT = (T/t) \times M \times (1/2) \times (1/D) \times t \times 2 = T \times (M/D) \qquad \text{Expression 3}$$

Therefore, it is possible to obtain a vehicle-speed pulse signal with an altered period by multiplying the period thereof by the altering ratio M/D (M and D are natural numbers).

This is because the DATA obtained from the period T of the vehicle-speed pulse signal and the oscillation period "t" of a clock signal is finally divided by the oscillation period "t" of the same clock signal.

An output pulse signal with the period TOUT output from the counter 85 is input to a F/V-converter (not illustrated). The F/V-converter is provided with a capacitor to generate a voltage according to a frequency of the output pulse signal. A pointer of a speedometer is drove in response to the generated voltage by the F/V-converter. In the present embodiment, because the output pulse signal with a duty ratio of 50% is generated described above, when a vehicle travels at almost constant speed, the output pulse signal having an accurate duty ratio of 50% can be input to the F/V-converter. If the duty ratio deviates from 50%, an error is included in the output voltage from the F/V converter. However, since the present embodiment can minimizes the error, the pointer of the speedometer can be driven accurately.

Various circuits used for the above embodiment are constituted as integrated circuits.

Figure 7:
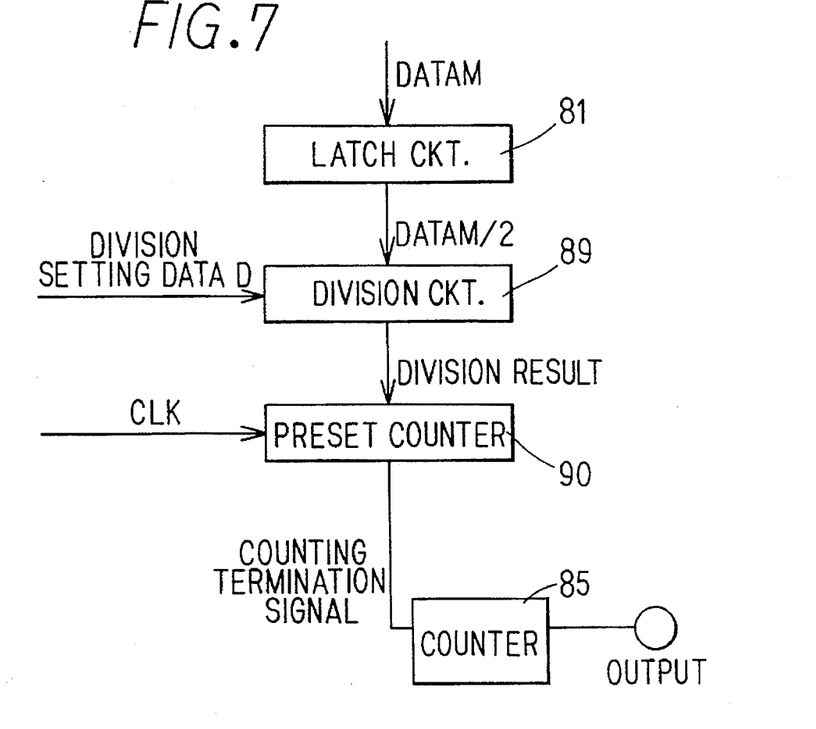
FIG. 7 is a circuit diagram showing another embodiment of the dividing and pulsing circuit 8.

In the above embodiment, division is performed at the generation timing of a clock signal sent from the oscillation circuit 5. However, it is also possible to previously perform division and then obtain the output pulse TOUT by using a clock signal sent from the oscillation circuit 5. That is, as shown in FIG. 7, the data DATAM/2 latched by the latch circuit 81 is divided by the division setting data D in a division circuit 89. The division result is set to a preset counter 90 and counted down by using a clock signal sent from the oscillation circuit 5. The output pulse TOUT with a duty ratio of 50% extended to twice cycle is formed by the counter 85 in accordance with a counting termination signal (corresponding to an output "0" of the CO terminal of the adder 83) when the counting is completed.

In the case of the circuits shown in FIG. 7, counting-down is performed by the preset counter 90. However, it is also possible to use a counter for counting up clock signals sent from the oscillation circuit 5, compare the counted value with a division result of the division circuit 89 by a digital comparator, and output the counting termination signal when the counted value coincides with the division result.

Moreover, in the above embodiment, the data DATAM is divided by 2 in the dividing and pulsing circuit 8 to form a pulse signal with a duty ratio of 50% by using the counter 85. However, it is also possible to divide the data DATAM by 4 and finally form a pulse signal with a duty ratio of 25%. However, unless the duty ratio of 25% or 50% is necessary, it is unnecessary to previously divide the data DATAM by a certain value.

Furthermore, it is possible to constitute the above circuits by using a microcomputer. Furthermore, the above circuits are constituted as means for realizing each function.

What is claimed is:

1. A vehicle speed detecting apparatus comprising:
   a gear rotating in accordance with traveling of a vehicle;
   vehicle speed pulse signal output means for outputting a vehicle-speed pulse signal with a period proportional to a rotational speed of said gear; and
   altering means for altering the period of the vehicle-speed pulse signal and outputting an output vehicle-speed pulse signal with the altered period,
   said altering means comprising:
      period detection means for detecting the period of the vehicle-speed pulse signal,
      multiplication means for multiplying the period by a predetermined multiplier,
      division means for dividing the multiplied period by a predetermined divisor, and
      pulse signal outputting means for outputting the output vehicle-speed pulse signal with the period obtained from said division means performed by said division means.

2. A vehicle speed detecting apparatus according to claim 1, wherein said division means comprises first division means for dividing the multiplied period by a natural number of a value 2 to produce a first division result, and second division means for dividing the first division result by the predetermined divisor to produce a second division result, and said pulse signal outputting means outputs the output vehicle-speed pulse signal with a duty ratio of 50% by extending the period equivalent to the second division result obtained from said second division means up to twice and generating a pulse signal having a high level only during a half of the extended period.

3. A vehicle speed detecting apparatus according to claim 2, wherein said division means comprises an adder which performs subtraction of an absolute value of the predetermined divisor from the multiplied period divided by said first division means, and a second latch circuit which latches the subtraction result performed by said adder, said adder continuing the subtraction until the subtraction result latched by said second latch circuit becomes smaller than the predetermined divisor.

4. A vehicle speed detecting apparatus according to claim 2, wherein said pulse signal outputting means has a counter circuit which generates the output vehicle-speed pulse signal of a duty ratio of 50% having the extended period.

5. A vehicle speed detecting apparatus according to claim 2, wherein said first division means comprises a first latch circuit which truncates a least significant bit of a digital data representing the multiplied period and thereby decreases a total number of bits of the digital data by 1.

6. A vehicle speed detecting apparatus comprising:

a gear rotating in accordance with traveling of a vehicle;

vehicle speed pulse signal output means for outputting a vehicle-speed pulse signal with a period proportional to a rotational speed of said gear; and altering means for altering the period of the vehicle-speed pulse signal and outputting the vehicle-speed pulse signal with the altered period, said altering means comprising:

clock signal generation means for outputting a clock signal with a constant frequency, period detection means for detecting the period of the vehicle-speed pulse signal as a number of clock pulses of the clock signal generated during the period thereof, altering-ratio setting means for setting an altering ratio, and pulse signal generation means for generating a pulse signal with a period obtained by multiplying the detected number of clock pulses by said altering ratio and a period of the clock signal.

7. A vehicle speed detecting apparatus comprising:

a gear rotating in accordance with traveling of a vehicle;

vehicle speed pulse signal output means for outputting a vehicle-speed pulse signal with a period proportional to a rotational speed of said gear; and altering means for altering the period of the vehicle-speed pulse signal and outputting an output vehicle-speed pulse signal with the altered period, said altering means comprising:

clock signal generation means for outputting a clock signal with a constant frequency, period detection means for detecting the period of the vehicle-speed pulse signal as a number of clock pulses of the clock signal generated during the period thereof, multiplier setting means to which predetermined multiplier data is set, divisor setting means to which predetermined divisor data is set, and pulse signal generation means for generating a pulse signal with a period obtained by multiplying the detected number of clock pulses by the multiplier data, dividing the detected number of clock pulses multiplied by the multiplier data by the divisor data, and multiplying the detected number of clock pulses divided by the divisor data by a period of the clock signal.

8. A vehicle speed detecting apparatus according to claim 7, wherein said pulse signal generation means includes means for performing subtraction of the divisor data from the detected number of clock pulses multiplied by the multiplier data repeatedly at a generation timing of the clock signal in order to perform division using the divisor data and multiplication using the cycle of the clock signal.

9. A vehicle speed detecting apparatus according to claim 7, wherein said pulse signal generation means includes division means for performing division using the divisor data and period detecting means for detecting a time period in which the clock pulses are generated up to the number obtained from said division means in order to perform multiplication using the period of the clock signal.

10. A vehicle speed detecting apparatus according to claim 9, wherein said period detecting means detects the time period in which the clock pulses are generated by counting down a preset number presetting the number obtained from said division means in accordance with the clock signal.

11. A vehicle speed detecting apparatus according to claim 7, wherein said pulse signal generation means includes multiplication means for multiplying the detected number of clock pulses by the multiplier data, cyclic pulse signal generation means for generating a cyclic pulse signal by dividing the number of clock pulses multiplied by the multiplier data by a natural number of 2 dividing the number of clock pulses divided by the natural number of 2 by the divisor data and multiplying the number of clock pulses divided by the divisor data by the period of the clock signal and output means for outputting the output vehicle-speed pulse signal with a duty ratio of 50% by extending the period of the cyclic pulse signal up to twice and generating a pulse signal having a high level only during a half of the extended period.

* * * * *